Figure 1:
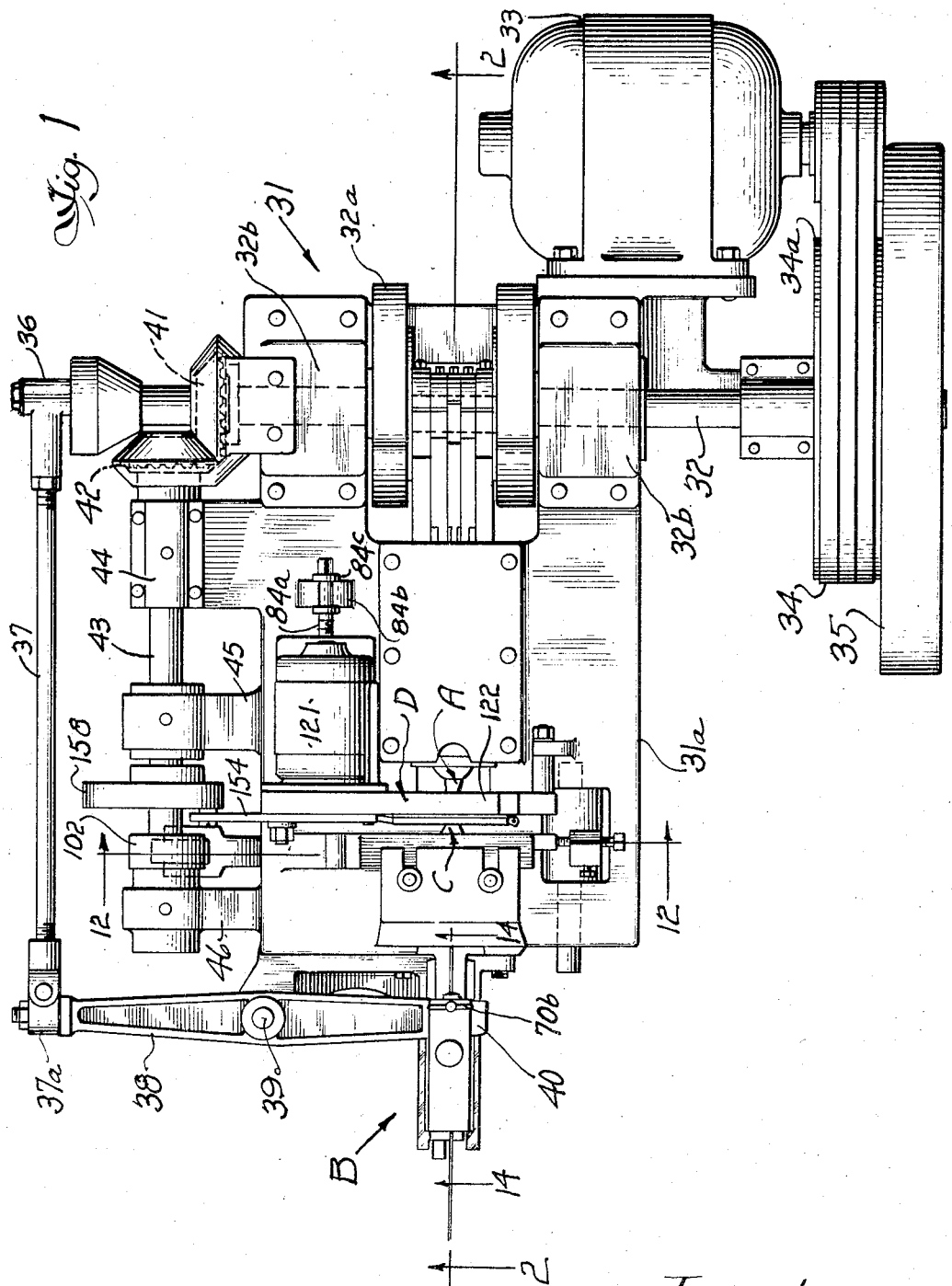

April 14, 1959 A. L. JOHNSON 2,881,726
APPARATUS FOR PRODUCTION OF TUBULAR STUDS AND THE LIKE
Filed Feb. 8, 1956 9 Sheets-Sheet 1

Inventor,
Andrew L. Johnson
By Jones Tesch & Darbo,
Attys.

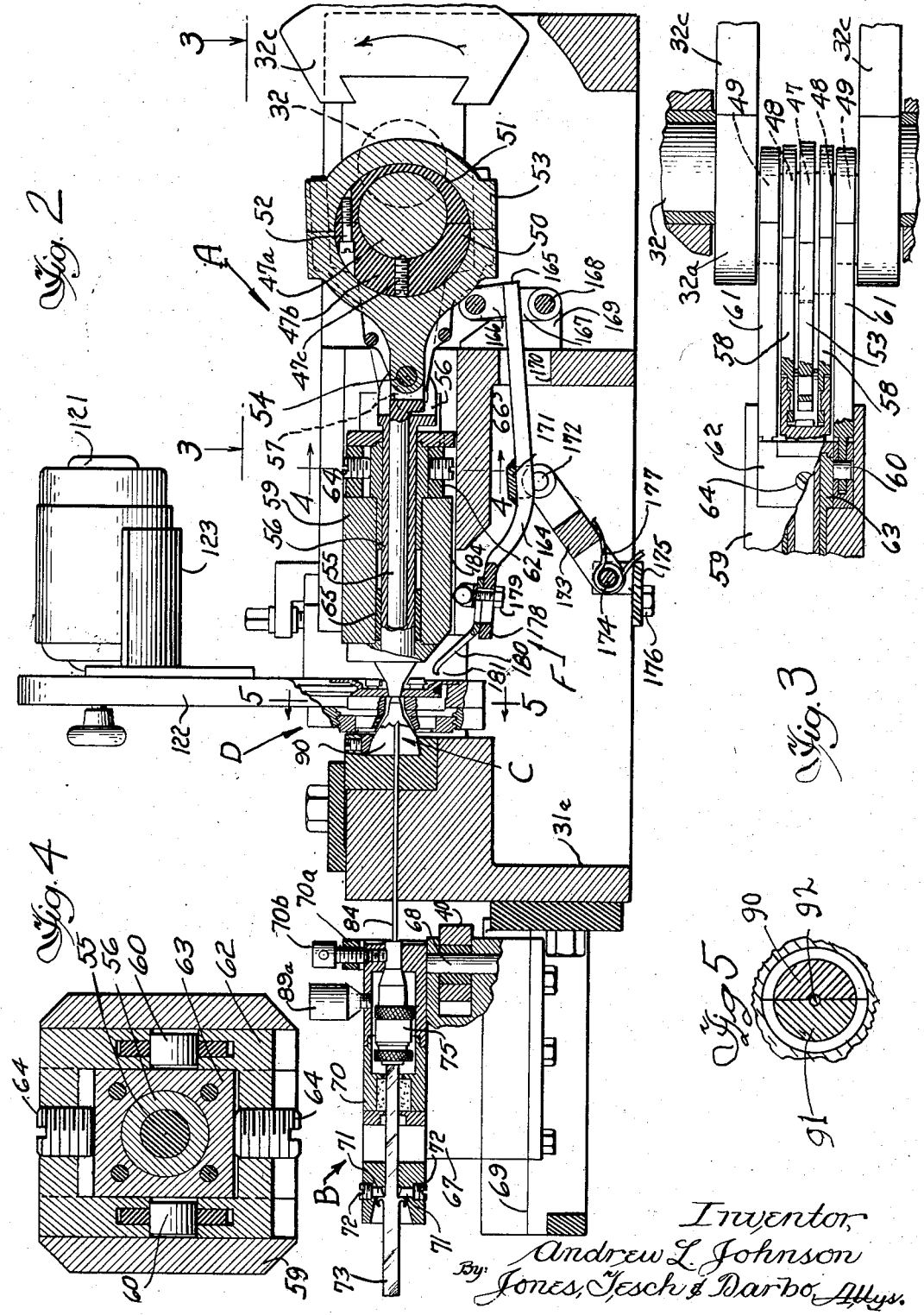

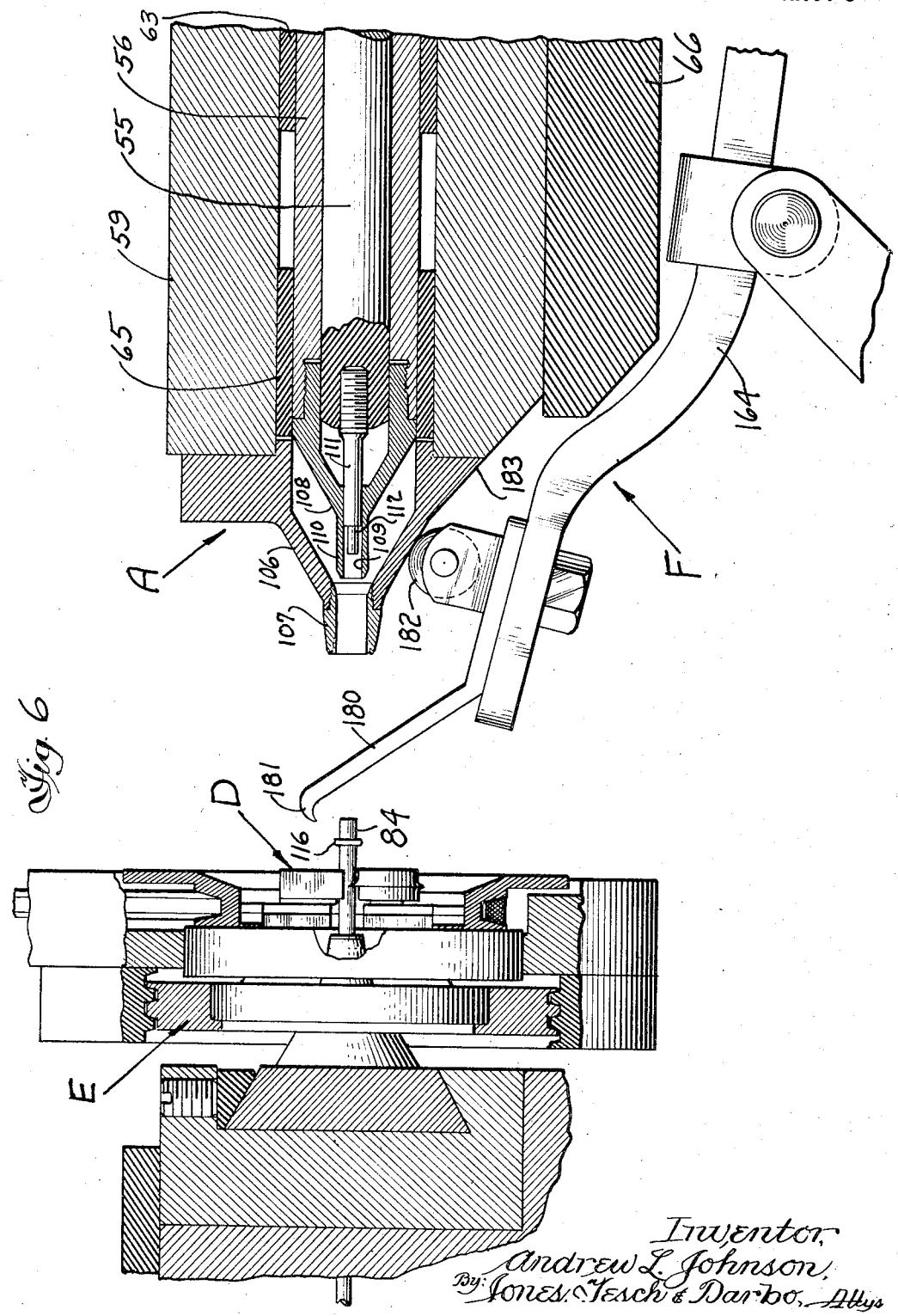

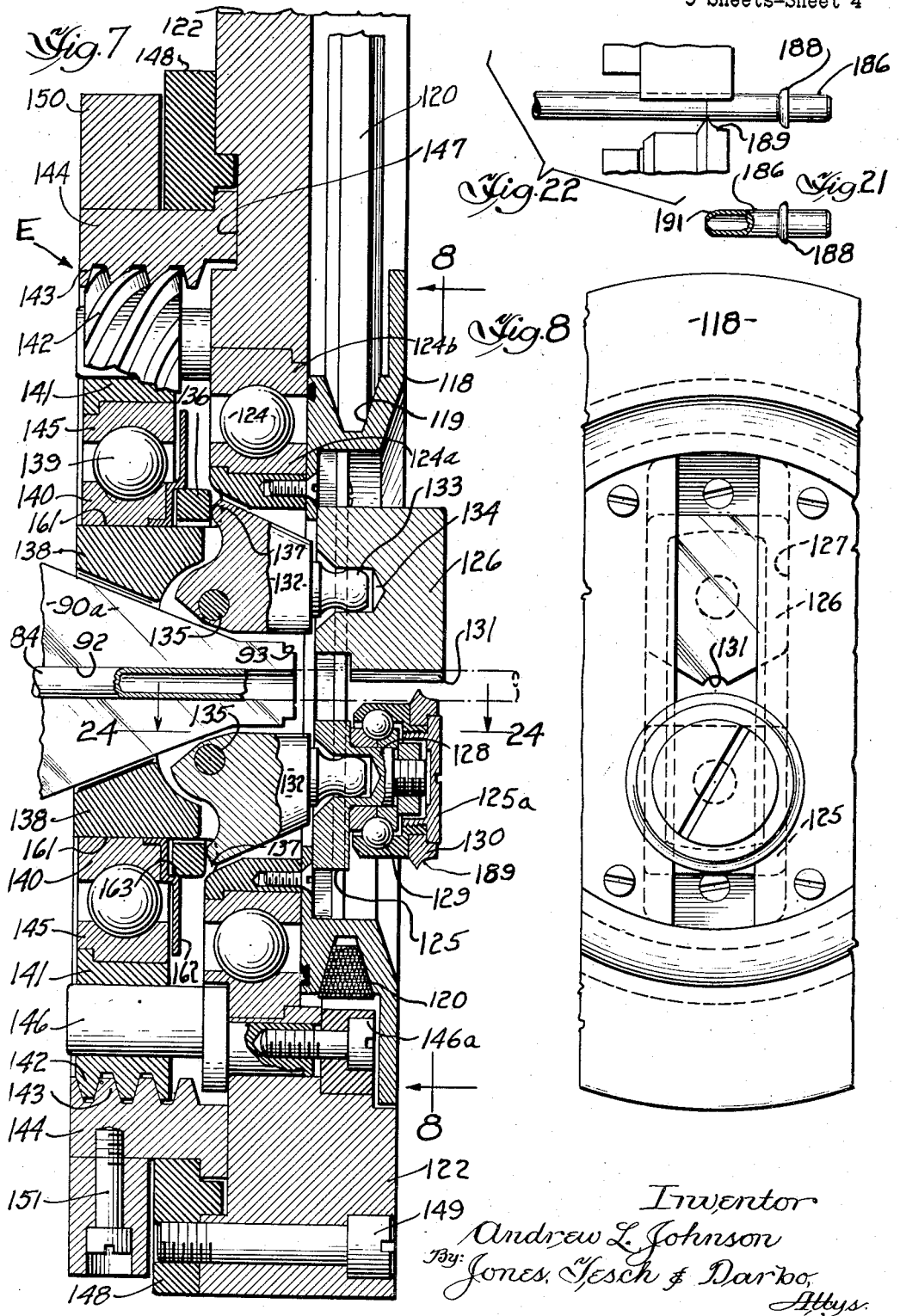

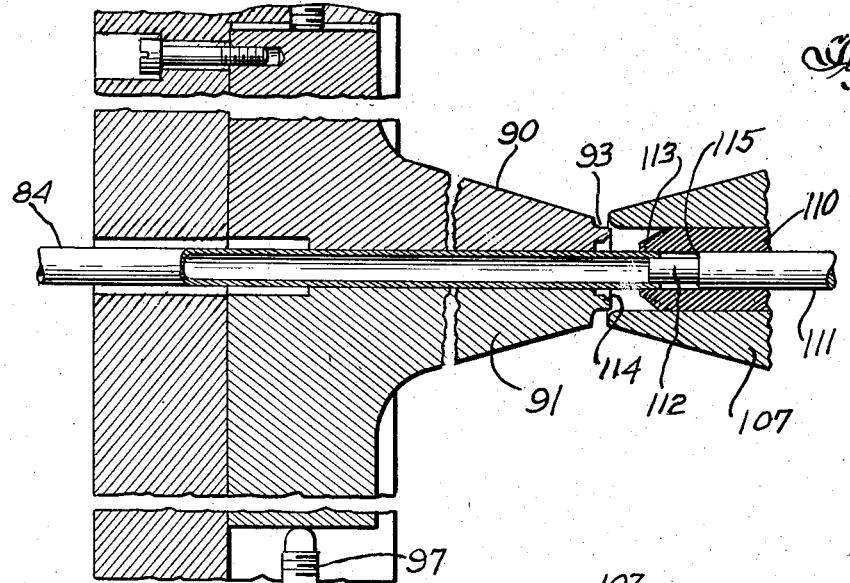

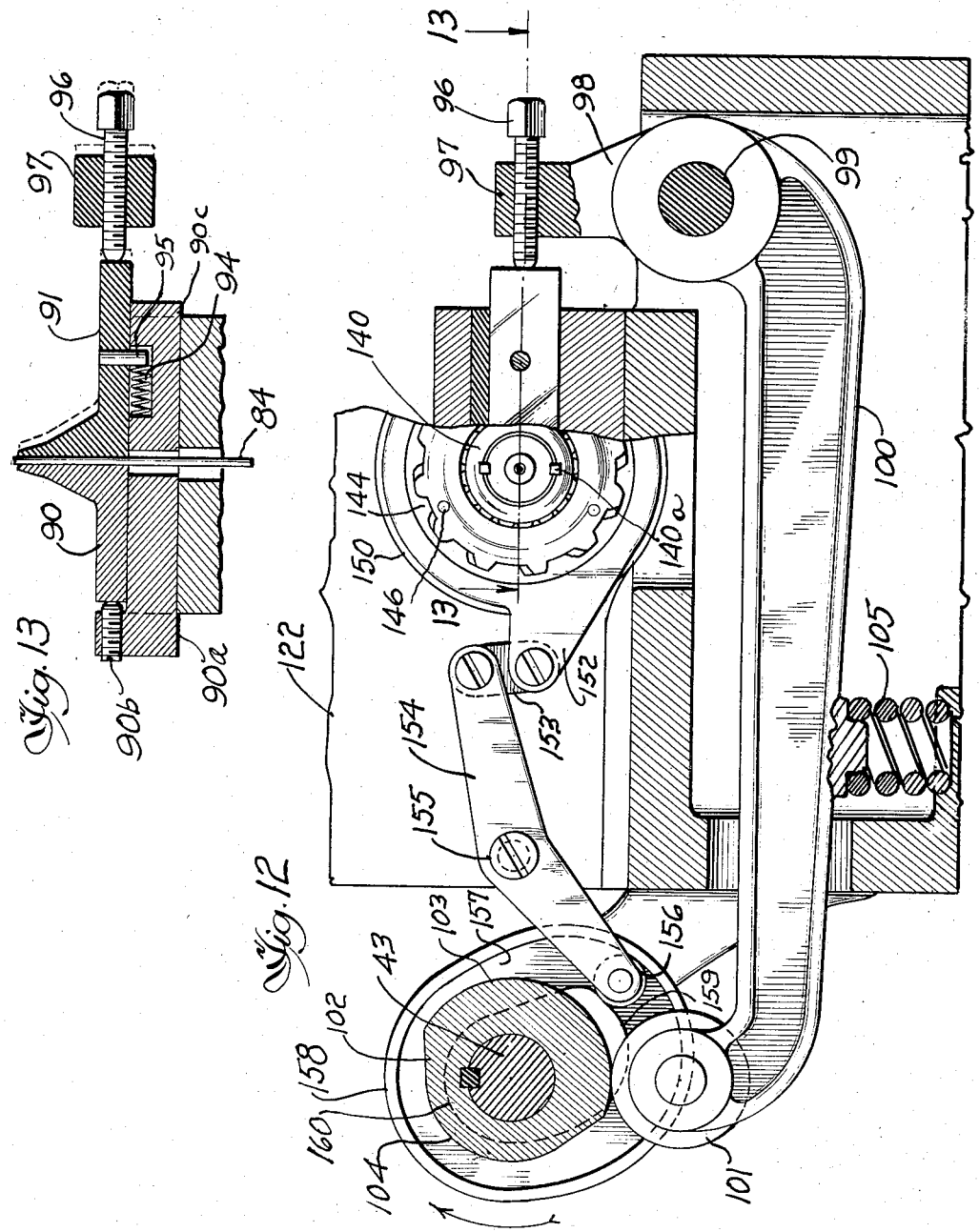

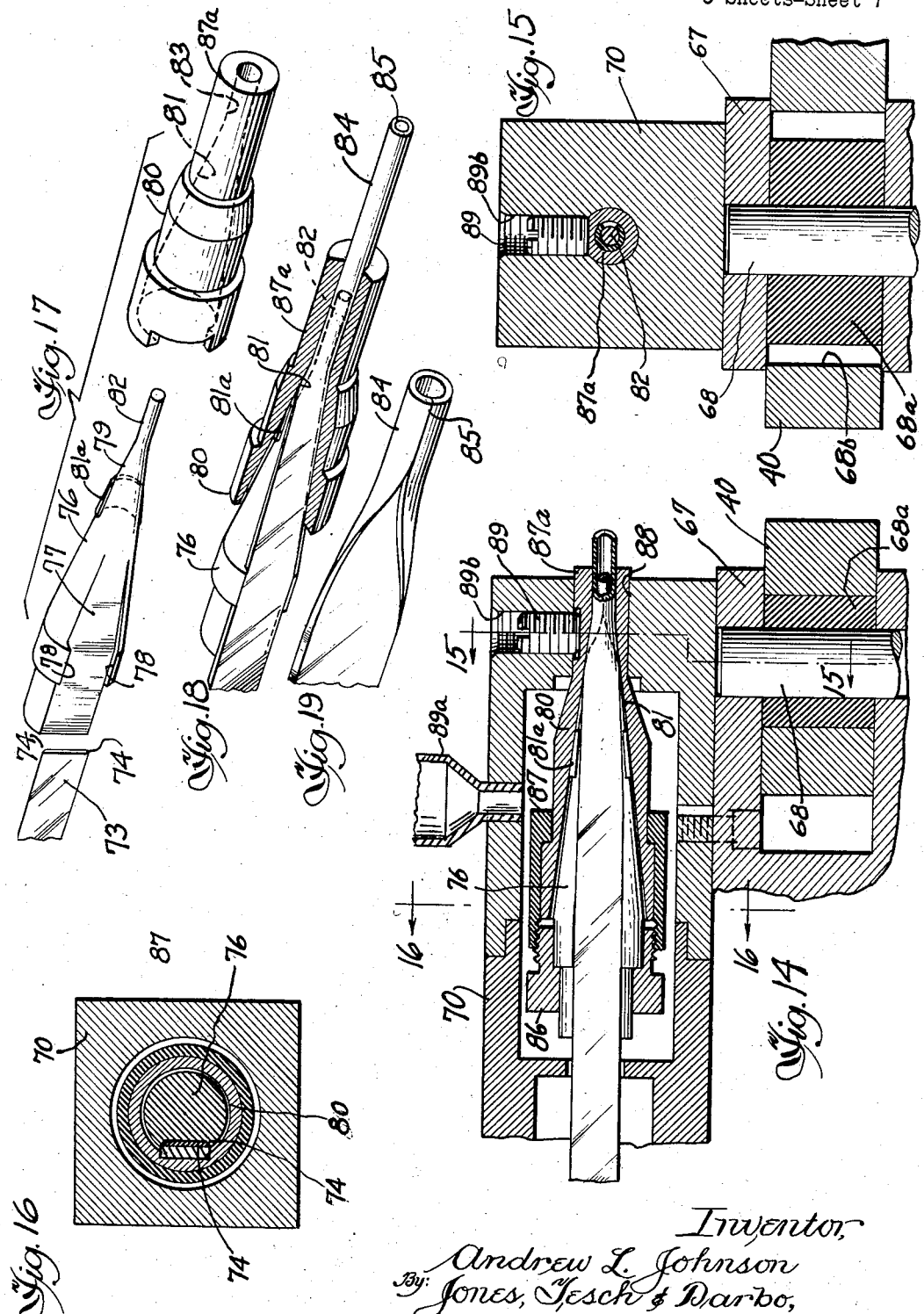

April 14, 1959 A. L. JOHNSON 2,881,726
APPARATUS FOR PRODUCTION OF TUBULAR STUDS AND THE LIKE
Filed Feb. 8, 1956 9 Sheets-Sheet 8
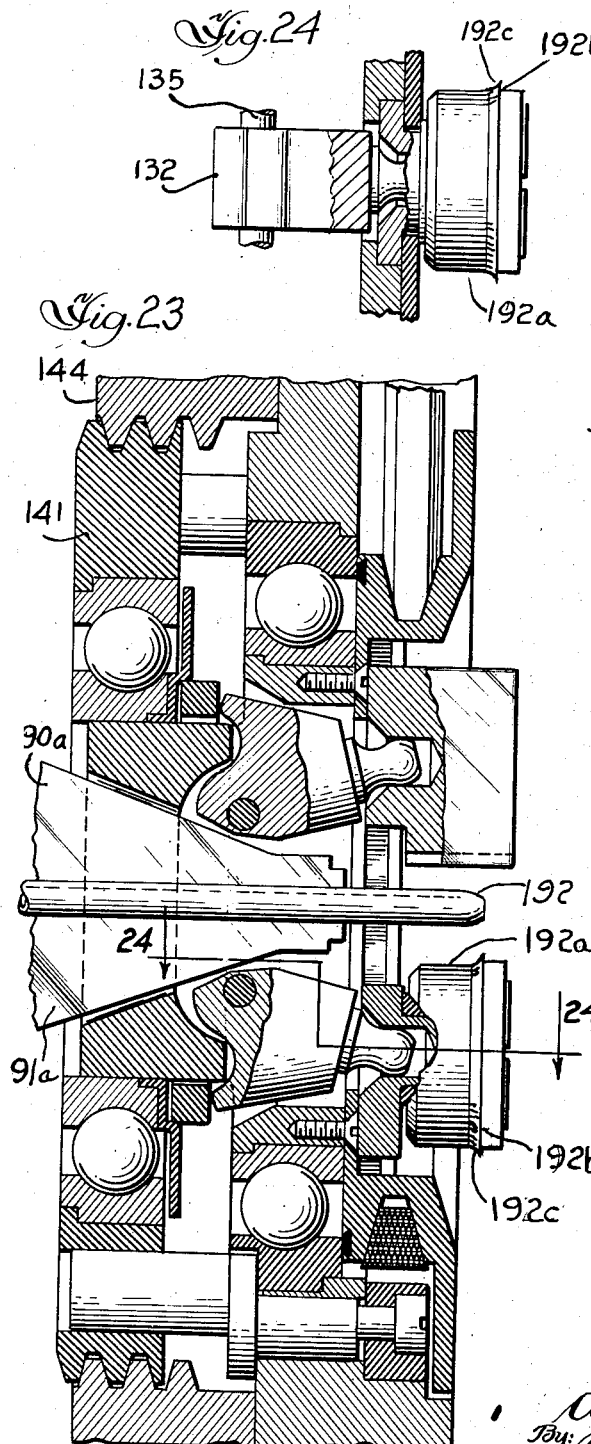
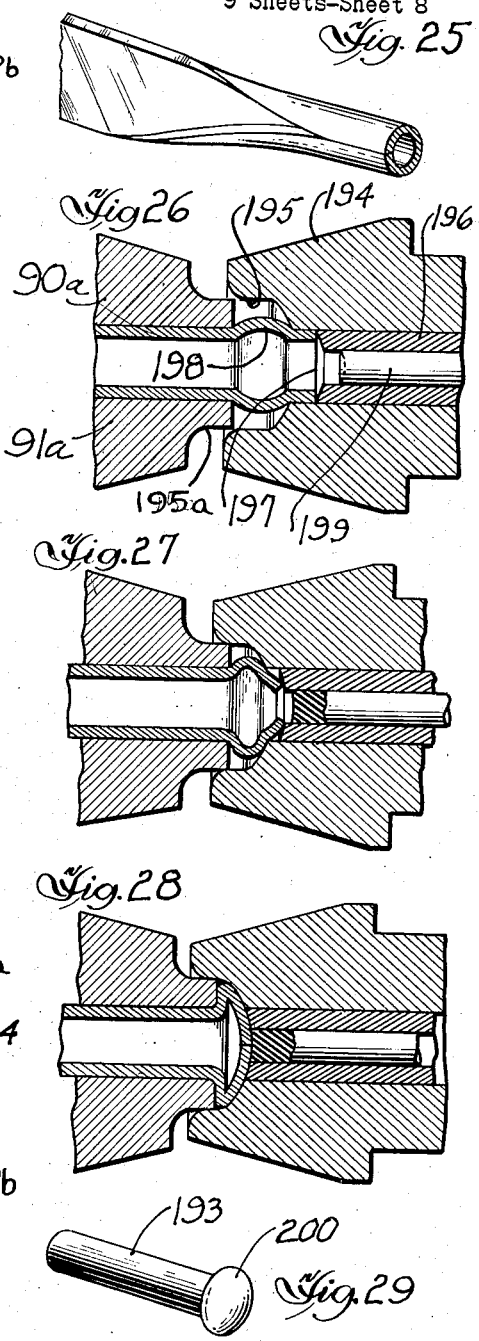
Inventor
Andrew L. Johnson
By: Jones, Tesch & Darbo
Attys.

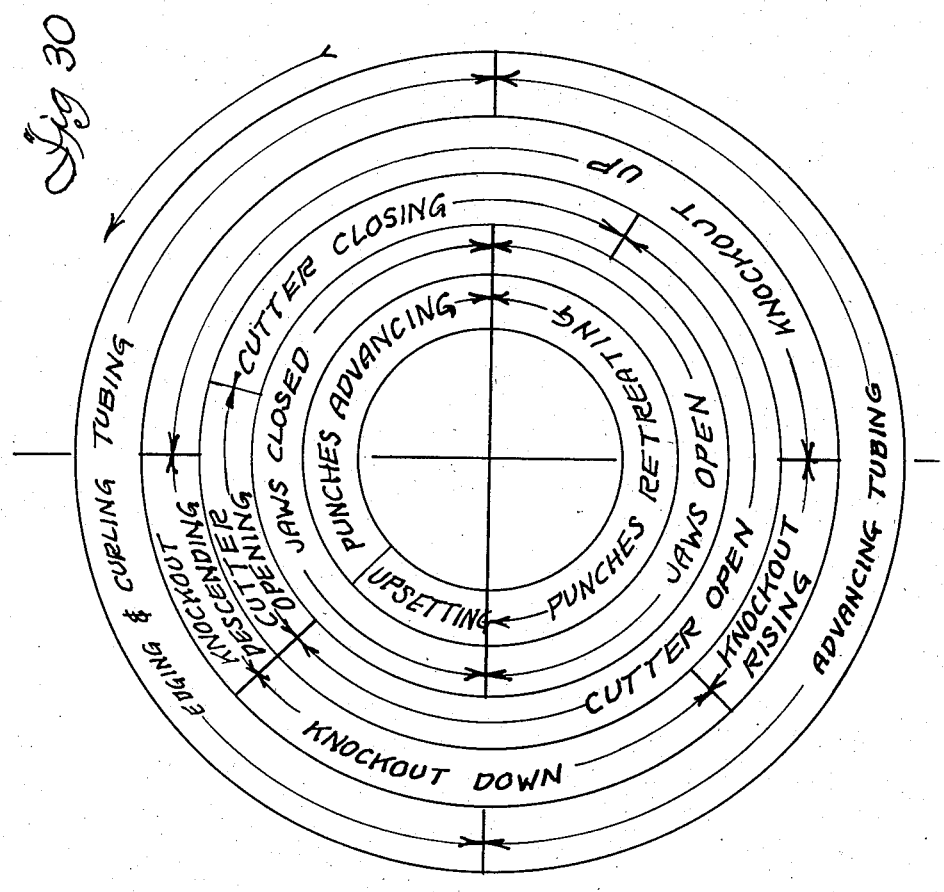

United States Patent Office 2,881,726
Patented Apr. 14, 1959

2,881,726
APPARATUS FOR PRODUCTION OF TUBULAR STUDS AND THE LIKE

Andrew L. Johnson, Skokie, Ill.

Application February 8, 1956, Serial No. 564,246

9 Claims. (Cl. 113—1)

This invention relates to the production of tubular studs or the like and embraces an apparatus for making said studs.

Heretofore, studs or the like, which term includes, as here used, electrical contact pins, terminals, jacks, sleeves, rivets, eyelets, grommets and such articles, have generally been made either by turning and drilling solid stock or by a stamping and deep drawing operation, either of which are expensive and sometimes prohibitively so. Suggestions have been made for forming such parts from light-gauge flat stock, but such suggestions have not been carried out successfully from the standpoint of economy of apparatus and simplicity of operation.

The present invention aims to provide a relatively simple and economical apparatus for producing such tubular parts from flat stock continuously and rapidly so as to minimize markedly the cost of operation, including the amount of space occupied by the apparatus and necessary labor in connection therewith.

In an important aspect, the invention contemplates the provision of a relatively continuous strip of stock material, continuously curling the strip into a tube, and successively shearing the tube adjacent the leading end thereof to provide a severed segment sufficient for the stud or the like. It is to be understood that the word "continuously," as here used, includes a step by step or stop and go movement.

In another aspect of the invention, a shoulder is formed by an upsetting operation on the segment just before said shearing operation.

In still another aspect, the curling of the strip to a tube and the upsetting of the tube to form a shoulder are performed while the tube is at a standstill and the edge of the strip is trimmed simultaneously with the curling step, during which time the severing operation is being performed, including an alternate stop and go advance of the tube.

These and other objects and advantages will be more fully explained, and the invention will be understood, by reference to the accompanying drawings, showing an illustrative embodiment of apparatus following the invention and of illustrative process steps, and in which drawings—

Figure 1 is a general plan view of the apparatus;
Figure 2 is an enlarged longitudinal vertical section taken on the line 2—2 of Fig. 1;
Figure 3 is a fragmentary plan view partly in section of parts shown in Figs. 1 and 2;
Figure 4 is an enlarged cross-section on the line 4—4 of Fig. 2;
Figure 5 is a fragmentary and enlarged cross-section on the line 5—5 of Fig. 2;
Figure 6 is an enlarged view, partly in section, of parts shown in Fig. 2 in different positions;
Figure 7 is an axial section of parts shown in Fig. 6, on a larger scale;
Figure 8 is a fragmentary front view of parts shown in Fig. 7;

Figure 9 is an enlarged view, in cross-section, rotated 90°, of the holding jaws and punch plungers shown in Fig. 2, in their initial engagement with the tube;
Figure 10 shows the parts just referred to in a further stage of engagement;
Figure 11 shows them in a final stage of engagement for the formation of a said segment;
Figure 12 shows operating mechanism for the jaws and cutter, being a cross section taken on the line 12—12 of Fig. 1;
Figure 13 is a partial plan section on the line 13—13 of Fig. 12;
Figure 14 is an enlarged longitudinal vertical sectional view of parts shown in Fig. 2, being a section taken on the line 14—14 of Fig. 1, but omitting the clamping means;
Figure 15 is a cross section taken on the line 15—15 of Fig. 14, but omitting the grease cup;
Figure 16 is a cross section taken on the line 16—16 of Fig. 14;
Figure 17 is a perspective view in separated relation of parts shown in Fig. 14;
Figure 18 is a similar perspective view in assembled relation;
Figure 19 is a view of the tube in the process of forming, the tube being shown rotated 180° from that of Figs. 17 and 18;
Figure 20 is a perspective view of a completed electrical contact pin made by the method and apparatus here disclosed;
Figure 21 is a somewhat similar view of a shorter contact pin;
Figure 22 shows the arrangement of a tube segment and the cutters for the shorter contact pin of Fig. 21;
Figure 23 is a view similar to Fig. 7 but showing a slightly different cutter for making rivets, this figure also showing an alternative position of the cuter parts from that shown in Fig. 7;
Figure 24 is a fragmentary cross section on line 24—24 of Fig. 23.
Figure 25 is a view similar to Fig. 19 illustrating the forming of the tube for the rivet similar to the forming of the tube for the contact pin;
Figure 26 shows a first step in the forming of a rivet head;
Figure 27 shows an intermediate step in forming the rivet;
Figure 28 shows the final step in forming the rivet;
Figure 29 shows the completed rivet; and
Figure 30 is a timing cycle diagram for the apparatus, the sequences being shown in a counterclockwise direction.

Referring in detail to the illustrative construction shown in the drawings, numeral 31 indicates the apparatus or machine in general having a base 31a upon which is carried the main drive shaft 32, mounted as by bearings 32b, and which is driven by an electric motor, such as 33, also mounted on base 31a, through a belt drive 34 and pulley 34a, the main shaft having a fly wheel 35 mounted at one end thereof. At its other end the main shaft 32 carries a crank 36 that by a pitman 37 is connected as at 37a to the lever 38 that is intermediately pivoted as at 39 on the base 31a, the lever 38 having another end 40 later more particularly referred to.

In accordance with the present invention, the main shaft 32 carries intermediately thereof a bevel gear 41 that meshes with another bevel gear 42 pinned on the countershaft 43 mounted in suitable bearings such as 44, 45 and 46, rigid with the base 31a. Also intermediately the main shaft 32 carries thereon rigid therewith a system of eccentrics 47, 48 and 49 (Fig. 3). Each of these eccentrics, as best seen in Fig. 2 is made up of two parts, the eccentric 47 there seen comprising the crank element 47a and the eccentric element 47b keyed thereto as at 47c. The crank element extends rigidly between the crank blocks 32a which are in turn rigid with the main shaft 32 and carry inertia extension 32c. The eccentric element 47b is shown made up of two somewhat semi-cylindrical hollow parts 50 and 51 which are secured together about the eccentric element 47a by the screw 52. The eccentric 47 cooperates with the eccentric strap 53 that is articulated as at 54 with a central plunger 55 of the reciprocating tube upsetting punches of the machine and plungers therefor collectively indicated by A. The central plunger 55 reciprocates in a hollow plunger 56 that is articulated as at 57 with the eccentric straps 58 that cooperate with the eccentrics 48, one on each side of the central eccentric 47 and its strap 53. Similarly the hollow plunger 56 reciprocates in a plunger guide 59 that in turn is articulated as at 60 with the eccentric straps 61 that cooperate with the eccentrics 49, one on each side of each of the eccentrics 48 and straps 58. As best seen in Figs. 2, 3 and 4, the articulation 60 is made through the intermediation of a yoke 62 that is held to a core 63 by set-screws 64, the core 63 having a force fit in the plunger guide 59 and acting as a bushing for the reciprocation therein of the hollow plunger 56, there being another mating bushing 65 adjacent the distal end of the plunger guide 59. The plunger guide 59 travels back and forth on the track 66, and with it the hollow plunger 56 and the central plunger 55, each on a different stroke or throw under the influence of its respective eccentric already described, the degree of travel and the time of movement of the plungers and plunger guide being latter described.

Reverting to the lever 38, the end 40 thereof is in operative relation with a work feed mechanism that is also an edging and curling mechanism indicated generally by the letter B that slidingly reciprocates alternately with the upsetting punches A, that is to say that when the punches A are advancing the mechanism B is retreating, and vice versa. The mechanism B includes a sliding carriage 67 that is articulated with the end 40 of the lever 38 by a pivot pin 68 and the carriage reciprocates, under the influence of the lever 38, on the track 69 rigid with the frame 31a of the machine. Pivot pin 68 may have lost motion on elongated bushing 68a in the slot 68b of the lever end 40 (Fig. 15). Carried on the sliding carriage 67 is the shuttle casing 70 that is clamped to the carriage 67 by strap 70a and tension screw 70b and that has a passageway therethrough for the tubing stock being worked upon. At the outermost or rear end of the passageway and projecting thereinto are a pair of knives 71 adjustable by set screws 72, the knives being opposed and arranged to trim the edges of the flat strip stock 73 of brass or the like which constitutes the work in its initial form. The flat stock may be drawn from a coil thereof carried by a reel which need not be here shown. The knives 71 put a bevel on the strip 73 as shown at 74 (Figs. 16 and 17) so that when the strip is later curled into tube form these edges 74 will be swedged coplanarly together. At its inner end the shuttle casing 70 carries the forming curler mechanism 75 therein for curling the flat strip 73 into a tube. As best seen in Figs. 14 to 19 the forming curler mechanism 75 includes an inner tapered mandrel 76 that has a flat surface 77 receiving the edged strip 73 between guide flanges 78 that snugly lap the trimmed edges edges 74 of the strip and permit the latter to slide therethrough toward the forward reduced end 79 of the mandrel. The mandrel 76 is invaginated in the curler funnel 80 that has a tapering bore 81 receiving the mandrel 76 with just enough space to permit the strip 75 to advance therethrough between the mandrel and the curler tube and to be continuously curled into cylindrical or tubular form. Spacer piece 81a centers the mandrel in the funnel. The mandrel 76 has a straight nose 82 that cooperates with the cylindrical bore part 83 of the bore of the curler funnel to lead the formed tube 84 out of the edging and curling mechanism A in tubular form as best seen in Figs. 18 and 19, the formed tubing 84 having the swedged seam 85 (Fig. 18). It will be understood that Fig. 19 is shown rotated 180° with respect to Fig. 18 for clearness of description. Gland screw 86 and internally threaded nipple 87 hold the mandrel and curling funnel in assembly and the latter are together mounted in the passageway of the shuttle casing, the cylindrical portion 87a of the curling funnel snugly passed through the cylindrical aperture 88 in the inner or forward end of the shuttle casing 70 and clamped therein by set-screw 89. Clamping screw 70b may also seat in the opening 89b for set screw 89. Lubricant cup 89a is shown mounted on the casing 70.

When the machine is started up with a new strip of material the mechanism B is dissassembled temporarily and the strip has its edges trimmed off for a foot or two manually and the end of the strip is then curled up sufficiently to go through the aperture of the curling funnel without the curling mandrel therein. The end protruding through the curling funnel is manually gripped and held while the mechanism B is moved back over the strip, thus forming a few inches of rough curled tube. Then the mandrel is inserted in the curling funnel and the mechanism B is reassembled and the tubing pulled therethrough to form about a foot of perfect tube as at 84. The tubing thus more or less manually formed is then inserted into the gripped jaw mechanism indicated generally by the letter C.

The gripper jaw mechanism C includes a pair of complementary jaws 90 and 91 which are exteriorly somewhat conical in shape. The jaws 90 and 91 have the joint bore 92 (Fig. 5) therethrough for the passage of the tube 84 that is aligned with and between the curling sleeve end 87a and the central plunger 55. The jaws at their advance or forward ends (Fig. 9) are decreasingly tapered and have a reduced shoulder termination 93 that cooperates with the plunger guide of the plunger mechanism A as presently more particularly described.

The jaw member 90 is semi-permanently adjustable (Fig. 13) on the mounting piece 90a by set screw 90b, while the jaw member 91 is movably mounted on its mounting piece 90c. In one phase of the machine operation, the jaws 90 and 91 are separated by the action of a coil spring 94 pressing on a stud 95 carried by the jaw 91, sufficiently so that the tube 84 is not gripped by the jaws. In another recurring interval of the cycle of operation, the jaw member 91 is forced toward the jaw member 90 against the force of spring 94 to grip the tube 84, this action being performed by the pressure screw 96 that is adjustably carried by the lever arm 97 of a bell crank lever 98 that is pivoted at 99 on the frame 31a and has another longer arm 100 that carries a roller cam follower 101. Roller cam follower 101 is under the influence of a cam 102 pinned on the countershaft 43 that is driven by the main shaft 32 as previously described. The cam 102 has a cam rise 103, which, when the roller 101 is riding thereon, rocks the bell crank lever 98 and through pressure screw 96 causes the gripper jaws 90 and 91 to grip the tube 84. This occurs during alternate halves of the cycle of operation of the machine. Movements of the bell crank 98 for the other half-cycles are associated with the cam depression 104 of the cam 102 and the fact that while the roller 101 is riding on 104, the bell crank 98 is permitted to rock on its axis 99, urged by the compression coil spring 105, to retract the pressure screw 96 so that the jaws 90 and 91 are separated by the spring 94.

When the jaws 90 and 91 are closed and thus gripping the tube 84 and holding the latter stationary, the edging and curling mechanism B is moving rearwardly under the influence of the lever 38 relatively to the material strip 73 so that the strip is pulled therethrough by the jaws to edge the strip and also to curl a section thereof into the tube 84. During the alternate half cycle of operation of the machine, that is, when the jaws 90 and 91 are open, the mechanism B is moving forwardly under the influence of the lever 38 and because of the intimate contact of the curled tube with the curler of the mechanism B the formed curled tube 84 is moved forwardly with respect to and through the jaws 90 and 91.

When the gripper jaws are holding the tubing stationary, at which time the edging and curling mechanism B is moving rearwardly to perform its function, a sufficient extent of the tube 84 extends forwardly of the gripper jaws to be acted upon by the upsetting plunger mechanism A. The extent of the tube which projects forwardly of the gripper jaws may be initially adjusted manually by adjusting a cutter mechanism D presently more particularly described, this being done by means of a threaded stud 84a that is screwed into the mechanism D and that passes rotatably through a lug 84b and that has a pair of rigid collars 84c that hold it against axial movement. When the operation is first started, as previously described, by rotating the stud 84a the mechanism D, which is slidable on the machine bed may be adjusted rearwardly or forwardly for this purpose.

Reverting to the punch mechanism A (Fig. 6), the reciprocable plunger guide 59 terminates at its distal end in a hollow conical head piece 106 which is pointed by a guide ferrule 107 that is arranged (see Figs. 9, 10 and 11) to telescope onto the forward end of the joint gripper jaws, and over the jointly cylindrical reduced termination 93 thereof, the latter being snugly received within the plunger ferrule 107 when the tube upsetting action takes place. Similarly, the plunger barrel 56 which reciprocates within the plunger guide 59 terminates in a hollow conical punch carrier 108 that has a bore 109 and a punch 110 that moves through the ferrule 107. The central plunger 55 carries a die pin 111 that moves in the bore 109 of the punch carrier and thus in the punch 110 and has a reduced cylindrical extremity 112 that cooperates with the punch 110 and also with the ferrule 107 to act upon the tube. As the upsetting punch system A approaches the advance end of the tube, as shown in Fig. 9, the pin extremity 112 enters the open end of the tube, while, at the same time, the punch 110 telescopes onto the tube, guided by the ferrule 107. The hollow punch member 110 has a reduced end 113 that enters the counterbore 114 in the gripper jaws. Just before this occurs, however, the end of the tube 84 is abutted by the shoulder 115 of the die pin 111, and, since the tube is held by the jaws from retractive movement, the shoulder 115 and the reduced end 113 together form or upset into the counterbore 114 an annular shoulder 116 on the tube 84 as seen in Fig. 11. In the intermediate step shown in Fig. 10, in which the bulge of the tube to form the shoulder 116 is begun, indicated as at 117, the material of the hub flows into the counterbore 114 of the jaws. It will be understood that the respective throws of the eccentrics 47, 48 and 49 for the plungers of the punch mechanism A are suitably arranged to provide the movements just indicated.

As soon as the steps of Figs. 9, 10 and 11 are completed, occupying a very short time interval, the next arc of rotation of the main shaft 32 retracts the punch mechanism A and advances the edging and curling mechanism B, while at the same time releasing the gripper jaws C. This results in the tube 84 advancing through the machine and through the gripper jaws to the position shown in Fig. 6.

Immediately at the end of this advance movement of the tube a cutter mechanism D comes into play to cut off the upset section of tube which has the shoulder 116. As best seen in Fig. 7 the cutter mechanism D includes a constantly rotating wheel or rotor 118 that has a peripheral sheave groove 119 therein in which is trained a belt 120 that is driven by the separate electric motor 121, the motor 121 being mounted on a support 122 carried by and above the machine frame 31a, the support having a bracket 123 for the motor. The rotor 118 rotates on an axis that is coincident with tube 84 about the gripper jaws 90 and 91 on anti-friction bearings, one series of ball bearings being indicated at 124, having the inner race 124a that rotates with the wheel 118 and the outer race 124b that is stationary with the support 122. Radially movably mounted on the face of the wheel 118 are a pair of cutter elements 125 and 126. These cutter elements 125 and 126 are radially slidable in a diametric slot 127 in the face of the wheel 118. Cutter element 125 carries a rotating knife holder 125a which rotates with respect to cutter element 125 on spindle 128 through the intermediation of ball bearings 129, the spindle 128 itself rotating with the rotor 118. The knife holder 125a has secured thereon a circular knife blade 130 that cooperates with a groove 131 in the cutter element 126 to transversely cut the tube 84, cutter element 126 acting as a pallet for the blade.

To move the cutter elements 125 and 126 toward each other inwardly radially of the rotor 118, against the action of centrifugal force, these cutter elements are each controlled by a pivoted dog 132. The dogs 132 carry cam knobs 133 at their forward ends that loosely enter recesses 134 in the rear faces of the cutter elements respectively. The dogs 132 are transversely pivoted at 135 respectively in the rotor 118 and are swingable at their knob ends upon these pivots toward and away from the axis of the wheel. This movement of the dogs is responsive to movement of the axially sliding clutch ring 136 that abuts cam lug formations 137 that project radially outwardly of the dogs respectively. That is to say, when the clutch ring 136 is moved axially forwardly (to the right in Fig. 7) the dogs are rotated on their pivots to move the cutter elements radially inwardly to the position shown in Fig. 7 and Fig. 8, to cut the tube, while, when the clutch ring 136 is free to move axially rearwardly, the cutter elements, under the action of centrifugal force, move radially outwardly so as not to be in cutting position. It will be understood that during its cutting action, the circular knife blade 130 revolves under the influence of friction between it and the tube 84.

The clutch ring 136 is under the control of a nut-and-screw drive mechanism E that encircles the hub 138 of the rotor 118 and is carried thereon through the intermediation of ball bearings 139 that also serve as bearings for the rear end or hub of the rotor. The inner race 140 for these ball bearings 139 is slidably mounted on the hub 138 of the rotor 118 as well as rotating therewith, it being understood that the rotor is hollow on its forward face to accommodate the dogs and cutter elements, and that the hub 138 is also hollow to pass the gripper jaws 90 and 91 thereinto and into a position suitably spaced at their forward ends from the blade 130, and in which position, when the cutter elements are moved radially outwardly, the upsetting punches A can reach the advanced tube end.

The nut-and-screw clutch mechanism E includes a hollow screw 141 that has external large pitch threads 142 that are in mesh with the internal threads 143 of a nut member 144 that has limited rotation as presently described. Hollow screw 141 does not rotate but moves axially, as presently explained, with the outer race 145 for the ball bearings 139 which outer race is axially slidable together with the inner race 140 while like screw 141 being non-rotatable. The annuli 141—145 have limited axial sliding movement on studs 146 (held by screws 146a) that project rearwardly from the cutter wheel support 122, such sliding movement being in response to rotation of the nut member 144 as next described.

For the purpose of actuating the clutch ring 136, the clutch drive nut member 144 may be partially rotated, but without moving it axially, on the rotor support 122, the latter being grooved on its rear face as at 147 to receive the edge of the nut member and in which groove the nut member is rotatively secured by the keeper ring 148 which is held to the support 122 by bolts 149. The clutch drive nut 144 is banded by an oscillatable member 150 secured to the nut 144 as by bolt 151 and having an offset lug portion 152 (Fig. 12) which is articulated, by the link 153, with the rocking lever 154 that is pivoted medially at 155 on the support 122. The other end of the lever 154 carries a cam roller 156 that rides in a cam groove 157 in the face of a cam plate 158 that is pinned on and driven by the cam shaft 43 that drives also the cam member 102. The cam groove 157 is somewhat elliptical and the cam plate 158 is mounted eccentrically on the shaft 43 so that the cam groove has a high point indicated at 159 and a low point indicated at 160. When the cam groove 157 is at its high point 159 with respect to the cam roller 156, the follower end of the lever 154 is depressed as shown in Fig. 12 and the nut 144 is rotated in a clockwise direction. Rotation of the nut 144 in this direction moves the clutch screw 141 axially to its furthermost position to the right in Fig. 7, as there shown, since a rotating nut, which is held against axial movement, will move axially an intermeshed contained screw, without rotative movement of the screw. In other words, the internal threads 143 of the nut 144 act as a cam, upon the helical threads 142 of the screw 141, to move the latter axially without rotation of the latter, this movement taking place on the studs 146, to close the cutter elements 125 and 126 as previously described. Conversely when the cam follower 156 of the lever 154 is riding in the low area 160 of the cam groove 157, the lever 154 is rocked in the opposite direction and the nut 144 is rotated counterclockwise (Fig. 12), at which time the screw 141 is moved axially on the studs 146 to the left, from the position of Figure 7 to the position shown in Fig. 23, to permit the clutch ring 136 to move axially in the same direction and the cutter elements 125 and 126 to move radially outwardly i.e., to open, under the influence of centrifugal force. It will be understood that this back and forth axial movement of the screw 141 (together with ball races 140, 145) takes place on the circular interface line 161 between the wheel hub 138 and the inner race 140 for the ball bearings 139, the race 140 sliding on the hub 138 of the rotor 118. Inner race 140 rotates with the hub 138 being keyed thereto at 140a and being permitted to rotate with respect to the race 145 and screw 141 by reason of the ball bearings 139 interposed between the inner race 140 and the outer race 145 therefor. Clutch ring 136 rotates with the inner race 140. The clutch ring 136 is centralized with respect to the cam lugs 137 of the dogs 132 by a cage ring 162 abutting the forward face of the inner race 140 and having the annular shoulder 163 abutting the clutch ring 136. Key 140a permits axial movement of inner race 140 on hub 138, as already described. Simultaneously with the interval of the cycle of operation when the cutter is closing to sever the advance tube end and the upsetting plungers A are fully retracted, as shown in Fig. 6, a knockout arm mechanism F comes into play and which will be next described.

The knockout mechanism F includes a swinging arm 164 that depends at its captive end 165 from a lug 166 that is articulated with a link 167 that is pivoted at its lower end below the lug 166 as at 168 on a pair of brackets 169 projecting from the main frame 31a in the vicinity of the main shaft 32 and suitably therebelow, the swinging arm 164 passing through a slot 170 in the frame and being aligned in the vertical plane of the central plunger 55. Intermediately of its length the swinging arm 164 has riding thereon a strap 171 that is articulated at 172 with a spring link 173 that is pivoted at its other end as at 174 to a bracket 175 bolted as at 176 to a lower part of the frame 31a. A torsion spring 177 associated with the pivot 174 and the link 173 urges the latter toward a vertical position which in turn urges the swinging arm 164 upwardly at its distal end, the double hinged support 165 and 167 for the swinging arm permitting a lost motion movement in the latter on its fulcrum 168 that causes the free end 178 of the swinging arm 164 to have a substantially straight line vertical movement, rather than an arcuate movement, under the influence of the spring link 173. Carried on the free end 178 of the swinging arm 164 as by a longitudinally adjustable bolt and slot connection 179 is a knockout finger 180 that has a curved beak 181. The attachment 179 also secures to the forward end of the swinging arm an anti-friction roller 182 that rides on the under surface of the plunger guide 59. At its forward end this plunger guide 59, by the underface of its conical termination 106, provides an oblique cam surface 183, which, when the plunger mechanism A is retracted, permits the swinging arm 164 to rise gradually under the influence of the torsion spring 177, and with it the knockout finger 180 so that the beak 181 of the latter is brought to a position above the tube 84, as in Fig. 6.

As soon as the punch mechanism A again begins its advance movement, i.e., moves to the left in Figure 6, and the cutter mechanism D has cut off the upset section of the tube, retrogression of the roller 182 with respect to the cam surface 183 depresses the knockout arm 180, and its beak 181 knocks off the cutoff section of the tube. As the upset punch mechanism A continues to advance to upset the newly advanced tube end the roller 182 rides on the bottom dwell surface 184 of the upset punch mechanism A and is held below the tube, against the resilience of the torsion spring 177, until the upset punch mechanism A again retreats and the parts again arrive at the respective positions shown in Fig. 6, preparatory to knocking off the last upset and cutoff section. The knockout arm might not be necessary if the machine were operated slowly but is desirable in high speed production.

Figs. 20, 21 and 22 show terminal contact members (of different lengths), 185 and 186 having the external annular shoulders 187 and 188 thereon respectively and in this instance it will be noted that the circular cutter knife 130 has a blade edge that is hollow ground on its forward face as at 189 to taper inwardly the tail ends 190 and 191 of the contact terminal members 185 and 186. Differences in lengths of the contact members may be accomplished by adjusting the length of the pitman 37 to vary the amplitude of stroke of the end 40 of the lever 38.

Fig. 23 shows an alternative position of the cutter mechanism when the cutter elements are in inoperative position under the influence of centrifugal force permitted by retractive movement of the clutch screw 141 as previously explained, but Figure 23 shows also somewhat different expedients for forming a modified tubular stud of rivet form as next described.

In the making of rivets 193, as shown in Figs. 26 to 29 inclusive, it is desirable that the forward end of the tube, left after a section is cut off, be tapered inwardly, by the cutter knife, as indicated at 192 (Fig. 23). For this purpose the slightly different rotary cutter 192a is used having a circular knife blade 192b that is hollow ground on its rear face 192c. Also for the making of rivets 193 modified jaws 90a and 91a (Fig. 26) are employed and in this case the plunger guide 194 has a counterbore 195 that receives the reduced ends 195a of the jaws. The hollow plunger 196 abuts the end of the tube after the plunger guide 194 has engaged the jaws and forces the partially closed end 192 of the tube farther together as at 197 and at the same time begins to form the bulge 198, the metal for which is extruded into the counterbore 195, forced thereinto by the jaws reduced end 195a and the hollow plunger 196. This continues as shown in Fig. 27 until the hollow plunger 196 reaches the counterbore 195, when the central plunger 199 then advances, as shown in Fig. 28, to close the turned in end to form the closed head 200 of the rivet 193, such head being another form of shoulder on the stud as here contemplated.

It will be understood that by suitable adaptations of the apparatus parts other hollow tubular articles such as grommets, eyelets and the like can be made by this same continuous automatic process.

The timing cycle diagram shown in Fig. 30 will be largely self-explanatory and reference thereto will aid in an understanding of the operation of the mechanism and apparatus here disclosed. The apparatus may be usefully operated at a speed of say 1/5 second for one cycle, with a production of finished articles of say, 300 per minute.

In general, it may be summarized, that, when the plunger mechanism A is advancing, the edging and curling mechanism B is retracting, and when the latter is advancing the former is retracting, these movements occurring during alternate half cycles of operation. When the mechanism A is advancing and the mechanism B is retracting, the jaw mechanism C is closed to grip the tube, and when the mechanism A is retracting and the mechanism B advancing, the jaws C are open to permit the tube to be advanced by the mechanism B. The cutter mechanism D is open when the jaws C are open and is closed during a part of the time when the jaws C are closed. The knockout mechanism F rises as mechanism A retracts but before the tube has been sufficiently advanced to be in the way of the rising knockout arm. The knockout mechanism F goes down just as the cutter mechanism D completes the cut and to be out of the way of the next advance of the upsetting mechanism as the latter engages the new tube end.

The invention is not intended to be limited to details of construction shown for purposes of illustration and furthermore it is not essential that all features of the invention be used conjointly since various combinations and sub-combinations may at times be advantageously employed. Such changes may be made as fall within the scope of the appended claims without departing from the invention.

What is here claimed is:

1. Unitary apparatus for forming tubular studs or the like, comprising, in combination with a common supporting structure, curling mechanism for forming a strip of material into a curled tubing, a pair of relatively movable jaws for clamping said formed tubing therebetween, feed mechanism including said curling mechanism for successively by a stop and go movement advancing the tubing toward the jaws, means for clamping the jaws on the tubing and simultaneously retracting the curling mechanism relatively to the tubing, upsetting means cooperating with said jaws for forming a shoulder on said tubing, said upsetting means moving into operation simultaneously with the retractive movement of the curling mechanism, said upsetting mechanism retracting while said curling mechanism is advancing the tubing and the jaws are open, cutter mechanism for cutting off a section of said tubing having the shoulder thereon, knockout mechanism for ejecting said cutoff section, and means carried by the feed mechanism and responsive to retractive movement of the curling mechanism for beveling the edge of the strip preparatory to curling.

2. Unitary apparatus for forming tubular studs or the like, comprising, in combination with a common supporting structure, curling mechanism for forming a strip of material into a curled tubing, a pair of relatively movable jaws for clamping said formed tubing therebetween, feed mechanism including said curling mechanism for successively advancing the tubing toward the jaws, means for clamping the jaws on the tubing and simultaneously retracting the curling mechanism relatively to the tubing, upsetting means cooperating with said jaws for forming a shoulder on said tubing, said upsetting means moving into operation simultaneously with the retractive movement of the curling mechanism, said upsetting mechanism retracting while said curling mechanism is advancing the tubing and the jaws are open, and cutter mechanism for cutting off a section of said tubing having the shoulder thereon.

3. The structure of claim 2 wherein the feed mechanism includes shaving means for forming a beveled edge on each side of the strip during retractive movement of the feed mechanism.

4. The structure of claim 2 wherein the cutter mechanism includes a pair of cutter elements, one constituting a rotating knife blade and the other a pallet for the blade.

5. Unitary apparatus for forming tubular studs or the like, comprising, in combination with a common supporting structure, curling mechanism including a tapered mandrel and curling funnel for forming a strip of material into curled tubing, a vibrating lever for reciprocating the curling mechanism, a pair of relatively movable jaws for clamping said formed tubing therebetween, mechanism including said lever for successively advancing the tubing toward the jaws by a stop and go movement, means including a countershaft for clamping the jaws on the tubing, a main shaft for driving the countershaft and vibrating the lever, upsetting means driven by said main shaft cooperating with said jaws for forming a shoulder on said tubing, said upsetting means being driven through eccentrics by said main shaft and moving into operation simultaneously with the retractive movement of the curling mechanism, said upsetting mechanism retracting while said feed mechanism is advancing the tube and the jaws are open, cutter mechanism actuated by said countershaft for cutting off a section of said tubing having the shoulder thereon, a rotor carrying said cutter mechanism, and a separate drive for the rotor.

6. In unitary apparatus for producing tubular studs or the like, the combination with a common supporting structure, said structure carrying mechanisms for curling a strip of material to form a continuous tubing and for simultaneously upsetting the advance end of the tubing respectively, of a rotor carried by said structure, a hollow ring support therefor, anti-friction bearings for the rotor in said ring, a diametric slot in the rotor, a pair of cutter elements radially movable in the slot, a pair of dogs transversely pivoted in said rotor, said dogs each having a knob portion loosely entering a recess in the rear face of the cutter elements respectively, a cam projection on each dog, a clutch ring rotatable with the rotor and movable axially thereon, a hollow screw carried in the support abutting the clutch ring, studs on the support carrying said hollow screw for axial movement, a nut encircling said hollow screw and threadedly meshed therewith, said nut being held against axial movement but arcuately movable on said support, means for rotating the rotor and means for partially rotating the nut to move the screw axially to bring the cutter elements toward each other by the screw swinging said dogs to move the cutter elements radially toward each other.

7. The structure of claim 6 wherein the rotor revolves about a pair of relatively movable jaws axially received in the rotor, access to said jaws being provided at the face of the rotor when the cutter elements move apart radially under the influence of centrifugal force when the clutch ring is not forcibly moved axially against said dogs.

8. The structure of claim 6 wherein the screw drive of said screw and nut drive mechanism is actuated by a cam and lever connection with the feed drive.

9. In unitary apparatus for high speed forming of tubular studs or the like from flat strip material, a horizontally elongated base supporting said apparatus, horizontally reciprocating mechanism carried at one end of the base for curling the strip into a tubing, horizontally reciprocating mechanism carried at the other end of the base for upsetting the advance end of the tubing to form a shoulder thereon, mechanism for simultaneously moving the said mechanisms on the base in the same direction whereby the strip is curled while the shoulder is formed, means for cutting off the upset end of the tubing at the end of the movement of the curling mechanism in the opposite direction, and power means for actuating said apparatus including said mechanisms.

References Cited in the file of this patent

UNITED STATES PATENTS

| | | |
|---|---|---|
| 1,817,215 | Taylor | Aug. 4, 1931 |
| 1,878,640 | Miner | Sept. 20, 1932 |
| 1,885,648 | Wilcox | Nov. 1, 1932 |
| 2,168,853 | Abbey | Aug. 8, 1939 |
| 2,177,104 | Gonser | Oct. 24, 1939 |
| 2,260,891 | Ekstedt et al. | Oct. 28, 1941 |
| 2,262,178 | Gest et al. | Nov. 11, 1941 |
| 2,290,184 | Higgins | July 21, 1942 |
| 2,326,660 | Kosha | Aug. 10, 1943 |
| 2,373,531 | Bertalan | Apr. 10, 1945 |
| 2,437,477 | Parkin et al. | Mar. 9, 1948 |
| 2,568,439 | Friedman | Sept. 18, 1951 |
| 2,619,174 | Neale | Nov. 25, 1952 |
| 2,688,297 | Livermont et al. | Sept. 7, 1954 |
| 2,809,697 | Menzies | Oct. 15, 1957 |